Figure 4:
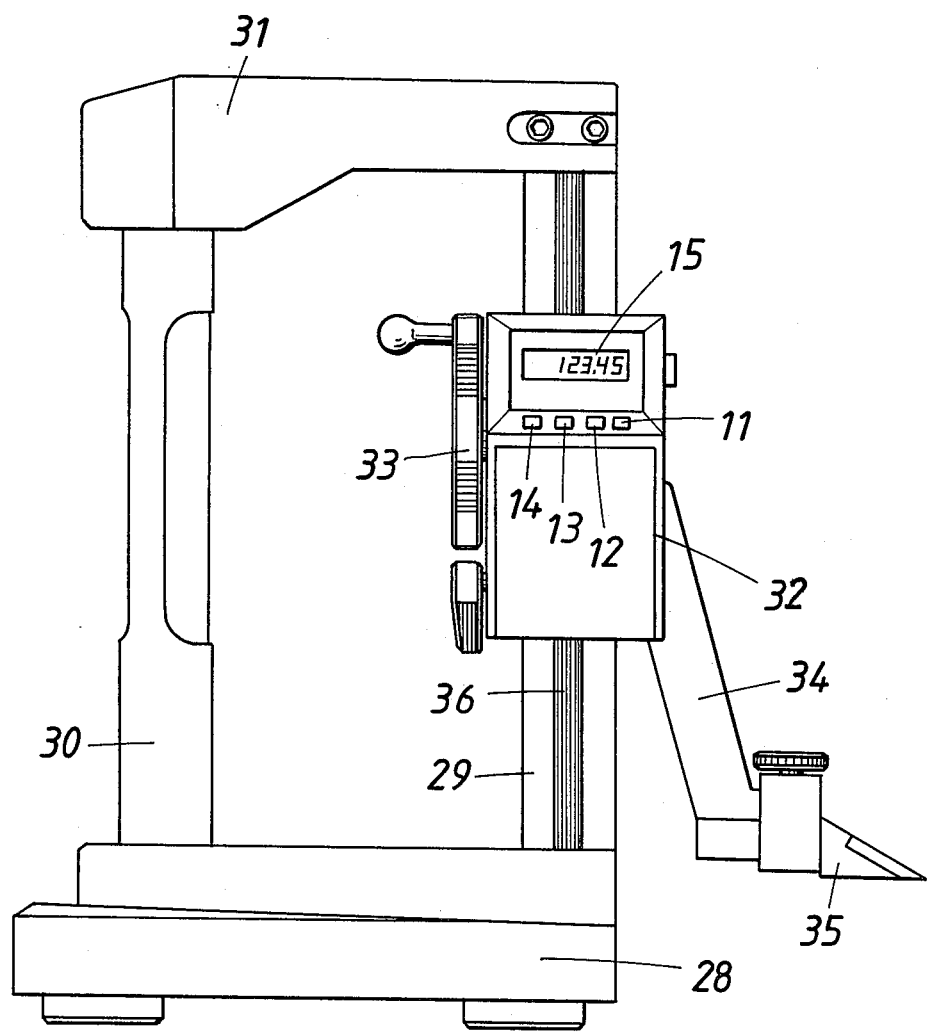

United States Patent [19]

Rieder et al.

[11] Patent Number: 4,459,749
[45] Date of Patent: Jul. 17, 1984

[54] HAND-HELD MEASURING IMPLEMENT

[76] Inventors: Heinz Rieder, A-5121 Ostermiething 154; Max Schwaiger, A-5121 Ostermiething 298, both of Austria

[21] Appl. No.: 410,618

[22] Filed: Aug. 23, 1982

[30] Foreign Application Priority Data

Sep. 14, 1981 [AT] Austria ............................. 3951/81

[51] Int. Cl.³ .......................... G01B 7/02; G01B 11/02
[52] U.S. Cl. ................................ 33/125 C; 33/143 L; 33/147 N; 33/DIG. 3; 250/237 G
[58] Field of Search ............ 33/125 A, 125 C, 143 L, 33/147 N, DIG. 3; 250/231 R, 237 G, 578

[56] References Cited

U.S. PATENT DOCUMENTS

| | | | |
|---|---|---|---|
| 3,142,121 | 7/1964 | Stefanov | 33/143 L |
| 3,344,700 | 10/1967 | Brake | 250/237 G |
| 3,816,003 | 6/1974 | Litke | 33/125 C |
| 4,031,595 | 6/1977 | Welker | 33/125 C |
| 4,037,325 | 7/1977 | Weber et al. | 33/DIG. 3 |
| 4,229,883 | 10/1980 | Kobashi | 33/143 L |
| 4,238,885 | 12/1980 | Lendi et al. | 33/143 L |

FOREIGN PATENT DOCUMENTS

| | | |
|---|---|---|
| 1548871 | 9/1969 | Fed. Rep. of Germany .... 33/125 C |
| 2352288 | 9/1974 | Fed. Rep. of Germany . |
| 2027880 | 2/1980 | United Kingdom . |

Primary Examiner—Richard R. Stearns
Attorney, Agent, or Firm—Kurt Kelman

[57] ABSTRACT

A hand-held measuring implement comprises a transparent scale-carrying member provided with a graduated scale. A reading unit is movable along said scale in unison with a feeler and comprises photoelectric receivers, which scan the graduated scale through respective line screens. The graduated scale is illuminated by light sources, which are disposed on the same side of the graduated scale as the receivers and are movable with the latter. Signal-processing circuitry is provided for processing the indicating signals generated by the receivers. The implement comprises also a display device and power supply means. To improve the light efficiency and to reduce the power consumption of the light sources and to reduce the effects of an ageing and soiling of the scale-carrying member, the latter is wider than the graduated scale and provided on the side opposite to the line screens with a reflecting covering. The light sources are arranged to direct light against that portion of the scale-carrying member which is laterally spaced from the graduated scale so that said light is reflected by the reflecting covering and subsequently transmitted to the receivers through the graduated scale, which is provided on that side of the scale-carrying member which faces the line screens, and through the line screens.

12 Claims, 5 Drawing Figures

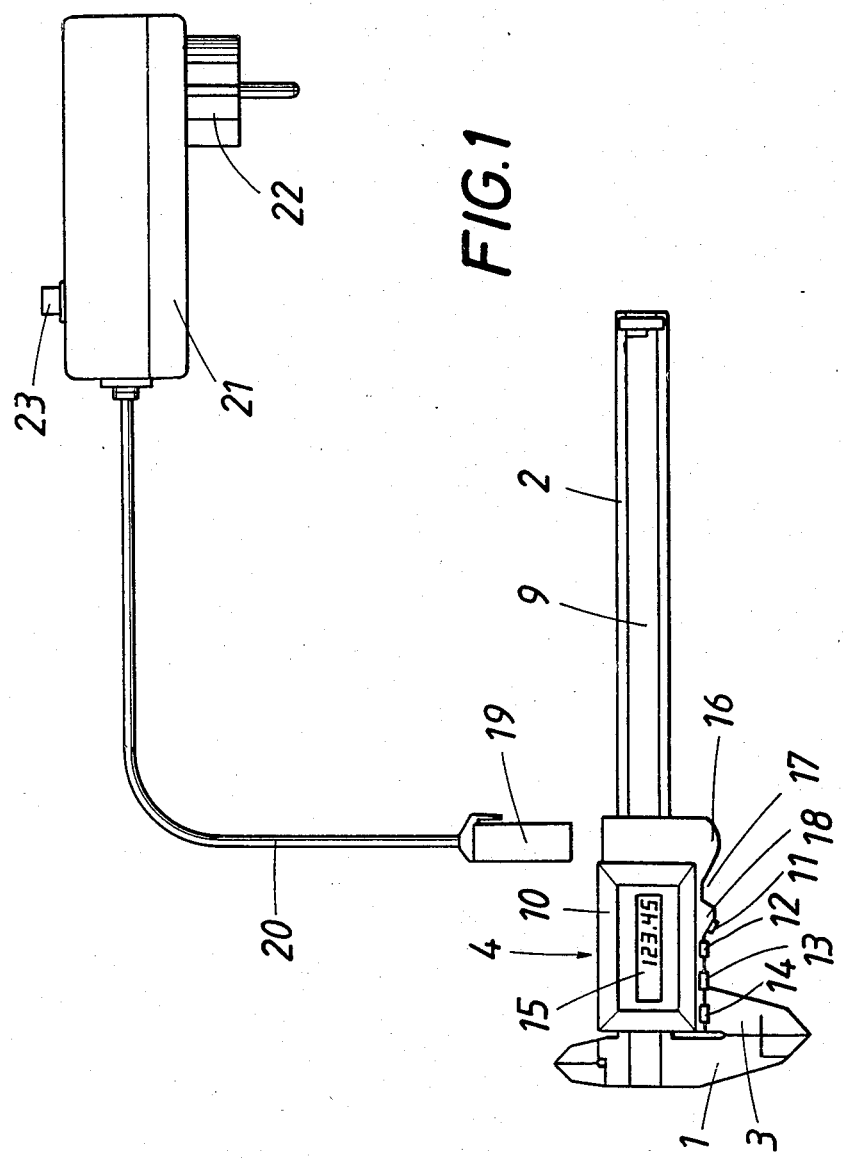

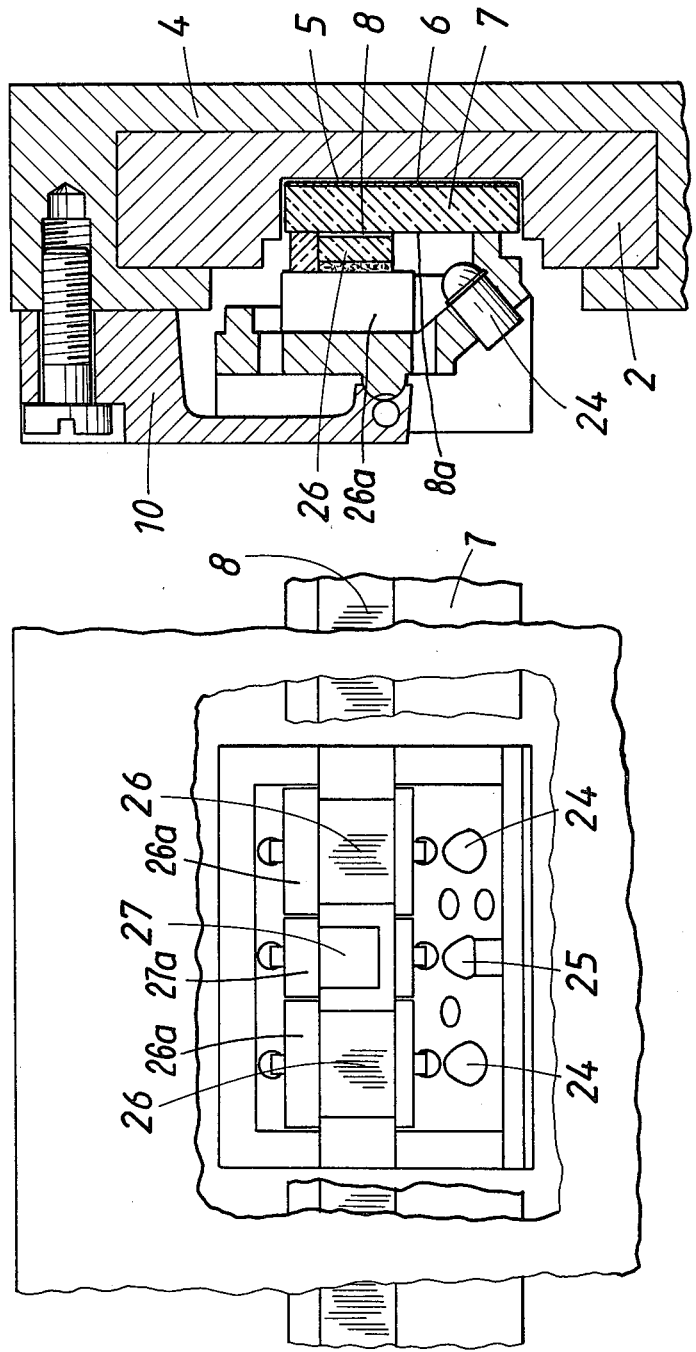

HAND-HELD MEASURING IMPLEMENT

This invention relates to a hand-held measuring implement comprising a scale-carrying member, which has a graduated scale having optically active, parallel graduation lines on a transparent substrate, preferably of glass, and a reading unit, which is movable in unison with a feeler along said scale and two scanning units, each of which comprises a photoelectric receiver, a light source and a line screen having optically active, parallel lines which are parallel to said graduation lines and disposed between said scale and the associated photoelectric receiver. The scanning units are spaced apart along the scale. The line screens are adapted to subject said photoelectric receivers to a cyclically changing illumination through said graduated scale and said line screens as said reading unit is moved along said scale. In response to said photoelectric receivers generate two cyclically changing, phase-displaced indicating signals. The number of excursions of said indicating signals generated by each photoelectric receiver is proportional to the number of graduation lines traversed by said photoelectric receiver. The implement also comprises signal-processing means for processing the indicating signals, a display device for generating a display in response to the processed indicating signals, and power supply means.

Hand-held measuring implements of that basic type are known as sliding caliper gages, depth gages and scribing blocks. They indicate the result of the measurement on the display device and are provided with additional electronic components for performing functions in addition to those of conventional implements. For instance, such implements may be used to measure tolerances or, if the display is held in position, exact measurements can be effected even at locations which are accessible only with difficulty and require a shifting of the measuring elements in order to remove and read the measuring implement. For tolerance measurements and other purposes, zeroing switches may be provided so that the zero point for the measurement need not be disposed at one end of a scale may be freely selected and after a wear of the measuring legs, e.g., when the legs of a sliding caliper gage have been reground, the zero position can be shifted to re-calibrate the measuring implement. Power is preferably supplied from separate batteries or from a mains-operated power supply section.

In almost all implements of the kind in which the graduated scale is scanned by optoelectronic means, reading is effected with reflected light and the line screens, the photoelectric receivers and the associated light sources are disposed on the same side of the scale. In that case, the scale-carrying member, which consists of glass and is susceptible to impact and shock, can be embedded in a groove so that it will be protected on all other sides. In the known method using reflected light, the scale is illuminated through the line screens adjacent to each photoelectric receiver and the graduations of the scale consist of reflecting material, such as chromium. Where the conventional lines are used on the scale and on the line screens and comprise transparent and opaque lines of the same area on the scale and the line screen, one-half of the light which is available will be lost at the line screen and the distance between the line screen and the scale must not be less than a certain minimum so that a uniform illumination of the scanned area of the scale through the line screen will be ensured. Besides, the illumination of the photoelectric sensors will highly depend on the reflectance of the reflecting parts of the scale. That reflectance can greatly deteriorate as a result of aging and soiling and even by the required cleaning of the scale. Whereas two phase-displaced signals are required to indicate the direction of movement of the feeler and for any electronic subdivision of the scale, e.g., by phase multiplier circuits or potentiometers, at least two photoelectric receivers which are displaced in phase from each other have previously been used to generate each signal and have been connected back to back to produce a signal train. This measure has been adopted because the brightness variations which may be due to ageing and soiling must be compensated as far as possible. A separate light source is required for each receiver and each receiver and each light source has a certain space requirement. Experience has shown that a large part of the power which is available is consumed by the light sources.

The main object of the invention is to provide a hand-held measuring implement which is of the kind described and in which the optoelectronic reading unit has a much lower power consumption and a smaller space requirement than in the known implements of the same kind and nevertheless generates signals which are only slightly influenced by ageing and can be perfectly interpreted. In accordance with a further development of the invention, the implement can be integrated in a larger measuring or interpreting system.

The essential step of the invention resides in that the scale-carrying member is provided with the graduation lines on the side facing the reading unit and its width exceeds the length of the graduations, the scale-carrying member is provided with a reflecting covering on the opposite side, the light source directs light against that portion of the scale which extends laterally beyond the graduation lines and said light is reflected by the reflecting covering and falls through the graduated scale and the line screens onto the receivers. In accordance with the invention, the graduated scale is not illuminated through the line screens but from a location which is disposed laterally of said line screens so that the shading which is due to the line screens is eliminated. Whereas in the method using reflected light, signals are derived from the light which is reflected by the graduation lines, the invention teaches to derive the signals from the light passing through the transparent spaces between the graduation lines. If the graduation lines are reflecting, the rear surface of the graduation lines will also reflect light so that part of the light which is incident on the graduation lines can fall on the receivers through the transparent spaces between the graduation lines after multiple reflection. Signals having the highest level which can be generated in the known implements can now be generated with only one-half of the light output per scanning unit or with a still lower light output. As a result, the power requirement of the reading unit is reduced to less than one-half. The quality of the signals will not be deteriorated by a decrease of the reflectance of the exposed graduation lines. The reflecting covering of the glass scale is substantially protected from ageing by the glass itself. Even a soiling of the surface of the scale-carrying member will adversely affect the generation of the signals to a much lower degree than in the conventional method using reflected light.

According to a further feature of the invention the space requirement of the optoelectronic scanning units is further reduced in that each scanning unit for generating an indicating signal consists of only one light source, one line screen and one photoelectric receiver rather than of two photoelectric receivers connected back to back, two light sources and two line screens and another scanning unit consisting of a light source and a photoelectric receiver is provided for generating a reference signal which corresponds to the average illumination of a scale portion comprising a plurality of graduation lines and which together with each indicating signal is supplied to a variable-gain amplifier included in the signal-processing circuitry. The level of that reference signal will vary in response to the soiling of the scale-carrying member and to an ageing of the receiver and said reference signal can be used in the variable-gain amplifier to amplify the indicating signal to a certain level so that the signal attenuation which is due to soiling or ageing can be compensated.

A simple structure and a special protection from soiling will be obtained if the scale-carrying member has side portions which protrude from opposite sides of the graduated scale and constitute slide tracks, with which the reading unit is in sliding contact. The movable part, such as a slider, may be connected to rigid bars or to flexible covering strips, which may be endless and open only adjacent to the reading unit and these bars or strips may cover the graduated scale except for the region adjacent to the reading unit. In that case the soiling of the graduated scale will be minimized. Because the operation does not depend on the reflectance of the graduation lines, the surface of the scale-carrying member can easily be cleaned with conventional cleaning agents.

Owing to the smaller space requirement of the scanning unit, a reading unit housing having the size which is customary in conventional implements of the kind under discussion may now be used to accommodate additional components and switches for adjustments and for selecting additional functions. According to a further feature of the invention the housing of the reading unit accommodates also a receptacle for a power supply plug and power supply terminal contacts as well as signal terminal contacts for the indicating signals are exposed in said plug receptacle. Said plug receptacle is adapted to receive a power supply plug, which contains batteries and has terminal contacts only for contacting the power supply terminal contacts of the receptacle or to receive a connecting plug which in addition to the terminal contacts for contacting the power supply terminal contacts of the receptacle comprises terminal contacts for contacting the signal terminal contacts and which is connected by a cable to an adapter unit, which comprises a power supply section and interface circuitry for converting and interpreting the indicating signals and is provided with means for connecting said circuitry to stationary units for indicating the results of the measurement and/or to controllers or recorders controlled by the indicating signals. As a result of that relatively simple measure the implement can be used as a normal hand-held implement, which is capable of performing the additional functions, which are permitted by the additional parts that have been included, or as a component of a larger recording, controlling or interpreting system, e.g., a statistics computer for tolerance measurements. As the power supply unit and the reading unit are interconnected, the voltage applied to the implement when used as part of a larger system will necessarily be constant. By means of the interface circuitry, the signals which may have been processed for the performance of certain additional functions of the self-contained hand-held implement and can be processed or transformed by means of the interface circuitry to have a form in which they can be processed by conventional computers or controllers.

Because less space is required in the housing of the reading unit, the slider may accommodate also memories which are required for tolerance measurements, or previously employed memories may be larger than in known implements.

Figure 5:
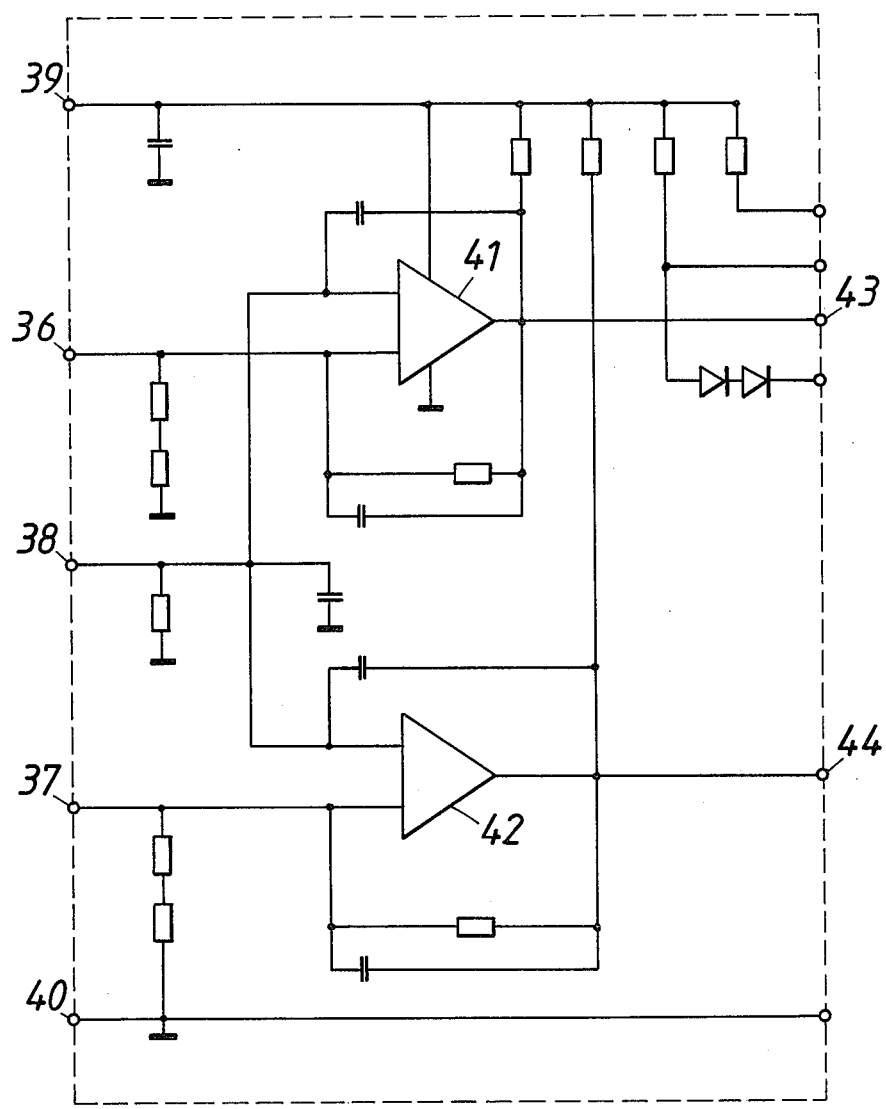

Embodiments of the invention are shown by way of example on the drawing, in which FIG. 1 is an elevation showing a hand-held measuring implement which constitutes a sliding caliper gage and is connected to an adapter unit, FIG. 2 is a top plan view showing as a detail the scale-carrying member and a reading unit viewed through the partly cut open slidable reading unit housing, FIG. 3 is a transverse sectional view showing the implement of FIG. 1 adjacent to the slider, FIG. 4 shows a hand-held measuring implement which constitutes, a scribing block and FIG. 5 is a circuit diagram of an amplifier circuit for amplifiying the signals generated by the reading unit.

The hand-held measuring implement shown in FIGS. 1 to 3 constitutes a sliding caliper gage having a stationary caliper leg 1, which is rigidly connected to a rail 2, and a movable caliper leg 3, which can be moved along the rail 2 by a slider 4.

The rail 2 has a longitudinal groove 5. A scale-carrying member 7 provided on its rear surface with a reflecting covering 6 is inserted into said groove 9 and has on a portion of its forward face a first elongate surface 8, which is provided with opaque graduation lines, which constitute a graduated scale. A covering bar 9 is connected to the slider 4 and is adjustable with the slider and together with the latter entirely covers the scale member 7 when the movable caliper leg 3 engages the fixed caliper leg.

The slider 4 comprises a housing 10, which contains optoelectronic sensors and associated integrated circuits, which constitute amplifying and evaluating circuitry and a microprocessor, also a memory and additional circuits for performing additional functions in response to the actuation of keys 11 to 14. Further additional functions may be initiated by an actuation of two of said keys. For instance, the key 11 may be used for zeroing, the key 12 for activating a memory, the key 13 as an auxiliary key for initiating additional functions and the key 14 for on-off switching. The power supply circuitry may include a timer, which deenergizes at least the main power consumers, i.e., the light sources and signal-processing circuits, after a predetermined period of time, e.g., one and a half minutes has elapsed whereas the energization of a memory for storing the last indicating signal may be continued so that said signal can be recalled at any time.

The key 13 can be actuated together with other keys to initiate additional functions. For instance, the joint actuation of the keys 13 and 12 may be used to write tolerance limits into a suitable memory and the joint actuation of the keys 13 and 11 may be used change from a reading in millimeter units to a reading in inch units and vice versa.

The slider housing 10 has a window 15 for a digital display. Numerals, alphabetic characters, symbols, such as signs, tolerance symbols, may be displayed. For tolerance measurements, for instance, the intermediate point in the left-hand area will be lighted if the measured dimension of the workpiece is within the tolerance range. The lighting of the left-hand arrow will indicate an undersize dimension and the lighting of the right-hand arrow an oversize dimension of the workpiece.

The slider is provided with handle 16 for reciprocating the slider. In order to prevent an inadvertent actuation of the switches 11 to 14 if the gage is handled clumsily or if a finger slips from the handle 16, the switch 11 is mounted on a projection 18 on the side thereof which faces away from the handle 16 and a recess 17 is provided between the handle 16 and the projection 17.

The handle 16 constitutes an open-topped plug receptacle, in which terminal contacts for connection to a power supply and signal terminal contacts for delivering indicating signals are provided. The signal terminal contacts are connected to suitable output terminals of the optoelectronic scanning units or of the functional units which are accommodated in the housing 10. If the implement is powered by batteries, a plug, which accommodates button batteries, is inserted into said receptacle. Such a plug will then contain only terminal contacts for contacting the power supply terminal contacts of the plug receptacle. If the implement is to be used with additional equipment, as is shown in FIG. 1, a connecting plug 19, which is connected to a cable 20, is inserted into the plug receptacle 16. That connecting plug 19 has terminal contacts for contacting the power supply terminal contacts of the plug receptacle as well as signal terminal contacts for contacting the signal terminal contacts of the receptacles. All these terminal contacts of the connecting plug 21 are connected to an adapter unit 21, which is provided with a power supply plug 22 and with interfacial switching and controlling circuitry for processing the output signals from the hand-held implement so that the processed signals can be used directly in computers and other interpreting means. An output connector 23 is provided for delivering data to such interpreting system.

The slider 4 is provided with three optoelectronic scanning units for scanning the graduated scale 8. Each scanning unit comprises a light-emitting diode 24 or 25. Each of the scanning units comprises a photo-electric receiver, e.g., a phototransistor 26a, which is disposed behind a line screen 26, which has opaque, parallel lines, which are parallel to the graduation lines of the scale. An entirely transparent window 27 is provided between the graduated scale 8 and the phototransistor 27a the intermediate scanning unit. The line screens are spaced apart by a distance which is equal to an integral multiple and a fraction of the spacing of the graduation lines in the first elongated surface 8 of the scale carrying member 7 so that the signals generated by the two phototransistors which succeed the line screens 26 will be displaced in phase. The light emitted by the photodiodes 24, 25 falls on a second elongated surface 8a of the scale-carrying member 7. The second elongated surface 8a is entirely transparent and extends beside the first elongated surface 8 along the same. The light which has entered the scale-carrying member 7 through the surface 8a is reflected by the reflecting covering 6 behind the scale-carrying member 7 of glass and the reflected light passes through the graduated scale 8 and through the line screens 26 or the window 27 onto the associated phototransistors 26a, 27a so that the latter generate signals which represent their instantaneous illumination. Those side portions of the scale-carrying member which are disposed laterally of the graduated scale 8 constitute slide tracks for the slider, which has ribs, which bear on the scale-carrying member.

FIG. 4 shows a measuring implement which consists of a scribing block and in its electric and electronic parts is designed like the sliding caliper gauge shown in FIG. 1.

The measuring implement shown in FIG. 4 comprises a base 28 and two columns 29, 30, which are carried by the base 28 and are connected at their top ends by an angled crosshead 31. That structure ensures a high stability and can be handled without a need to touch the column 29, which carries a scale-carrying member provided with a graduated scale 8. A slider 32 is slidably mounted on the column 29 and movable along the same by means of a gear train 33 and carries an arm 34, to which a scriber 35 is secured. Outside the slider 32, the scale-carrying member inclusive of the graduate scale is covered by a belt 36, which is guided in members 28 and 31 and is open at the slider 32 but endless elsewhere. The slider 32 accommodates the same components as the slider 4 and for this reason the function keys are designated with the same reference characters. A battery plug or a combined power supply and signal-transmitting plug 19 may again be used.

The circuitry for generating the phase-displaced indicating signals and, if desired, for multiplying said signals in order to effect an electronic subdivision of the scale, and for processing the indicating signals so that the various selectable functions can be performed and the display device in the window 15 can be actuated are known per se. FIG. 5 shows an example of an amplifier circuit which can be used in an implement according to the invention. The circuit receives 26a at terminals 36, 37 the signals which have been generated by the photoelectric receivers disposed behind the line screens 26 and at an input terminal 38 the signal which has been generated by the photoelectric receivers 27a disposed behind the window 27. Input terminals 39, 40 serve for the supply of power. A variable-gain amplifier 41, 42 having two input terminals is provided for each of the signals received via the input terminals 36 and 37 and receives said signal at one of its inputs. The signal which is generated by the photoelectric receiver sensor 27a behind the window 27 and corresponds to the average illumination of the window 27 is applied to the second input of each amplifier 41, 42 and controls the gain of the amplifier so that amplified signals delivered via output terminals 43, 44 and subjected to further processing have been corrected to eliminate to a large extent the influence of brightness fluctuations and of a soiling of the graduated scale.

What is claimed is:
1. In a hand-held measuring implement comprising
a transparent scale-carrying member provided with a graduated scale having uniformly spaced apart, parallel, optically active graduation lines,
a feeler, which is mounted to be movable relative to said scale-carrying member along said graduated scale,
a reading unit, which is coupled to said feeler to move in unison with said feeler relative to said scale-carrying member and comprises two photoelectric receivers which are disposed on one side of said scale-carrying member and face said graduated scale and are spaced apart along the same and adapted to generate indicating signals which are representative of the illumination of said photoelectric receivers, two line screens, each of which is disposed between one of said photoelectric receivers and said graduated scale and has parallel, optically active lines which are parallel to said graduation lines, and two light sources, each of which is associated with one of said photoelectric receivers and operable to illuminate the same through said graduated scale and one of said line screens, whereby said photoelectric receivers are adapted generate two cyclically changing indicating signals in response to the illumination by said light sources as said reading unit is moved along said graduated scale, said photoelectric receivers having such a spacing along said graduated scales that said cyclically changing indicating signals are displaced in phase, signal-processing circuitry for receiving and processing said cyclically changing indicating signals to generate processed indicating signals, a display device for receiving said processed signals and generating a display in response to said processed indicating signals, and power supply means for supplying electric power to said light sources, said signal-processing circuitry and said display device, the improvement residing in that said scale-carrying member has a first elongated surface, which faces said line screens and is provided with said graduated scale, a second elongated surface, which extends along said graduated scale and is free from said graduated lines, and a third elongated surface which extends along said graduated scale and faces away from said line screens, a reflector is provided which has a reflective surface, which adjoins said third elongated surface and faces said first and second elongated surfaces, and said light sources are arranged to emit light which is incident on said scale-carrying member on said second elongated surface and is subsequently reflected by said reflecting surface through said graduated scale and said line screens onto said photoelectric receivers.

2. The improvement set forth in claim 1, wherein said first and second elongated surfaces are juxtaposed on that side of said scale-carrying member which faces said line screens and said reflecting surface is provided on the opposite side of said scale-carrying member.

3. The improvement set forth in claim 1 as applied to a hand-held measuring implement wherein said scale-carrying member consists of glass.

4. The improvement set forth in claim 1, wherein said line screens are disposed outside the paths of light from said light sources to said elongated surfaces.

5. The improvement set forth in claim 1, wherein a slider is provided, which is mounted to be movable relative to said scale-carrying member along said graduated scale and carries said feeler, said reading unit, said signal-processing circuitry, said display device and said power supply unit.

6. The improvement set forth in claim 1, wherein said scale-carrying member comprises slide tracks which are disposed on opposite sides of said graduated scale and said reading unit is in sliding contact with said slide tracks.

7. The improvement set forth in claim 1, wherein said reading unit comprises two scanning units, which are spaced along said graduated scale and each of which consists of only one of said photoelectric receivers, one of said line screens and one of said photoelectric receivers and said reading unit comprises a third photoelectric receiver, which is adapted to generate an indicating signal in response to the average illumination of said graduated scale in a length portion thereof which comprises a plurality of said graduation lines, said reading unit also comprises a third light source for illuminating said third photoelectric receiver with light which is incident on said second elongated surface and reflected by said reflecting surface and then falls through said length portion of said graduated scale onto said third photoelectric receiver, and said signal-processing circuitry comprises two variable-gain amplifiers, each of which has an input terminal arranged to receive said indicating signals from said photoelectric receiver of one of said two scanning units and a gain control terminal arranged to receive said indicating signal from said third photoelectric receiver, each of said amplifiers being operable to amplify the signal applied to its input with gain depending on the signal applied to said gain control terminal.

8. The improvement set forth in claim 1 as applied to an implement in which said reading unit has a housing, which accommodates said photoelectric receivers, line screens, light sources, signal-processing circuitry and display device and is open toward said graduated screen, wherein said housing has a plug receptacle and carries terminal contacts, which are exposed in said receptacle and comprise a first set of terminal contacts for supplying said light sources, signal-processing circuitry and display device and a second set of terminal contacts for receiving said indicating signals, and a power supply plug, which is detachably fitted in said plug receptacle and has power supply terminal contacts contacting said terminal contacts of said first set, and contains battery means which constitute said power supply means and are connected to said power supply terminal contacts, said plug receptacle being adapted to receive instead of said power supply plug a connecting plug which has power supply terminal contacts arranged to contact said terminal contacts of said first said set and signal contacts arranged to contact said terminal contacts of said second set when said connecting plug is fitted in said plug receptacle in a predetermined orientation.

9. In a system comprising a hand-held measuring implement comprising a transparent scale-carrying member provided with a graduated scale having uniformly spaced apart, parallel, optically active graduation lines, a feeler, which is mounted to be movable relative to said scale-carrying member along said graduated scale, a reading unit, which is coupled to said feeler to move in unison with said feeler relative to said scale-carrying member and comprises two photoelectric receivers which are disposed on one side of said scale-carrying member and face said graduated scale and are spaced apart along the same and adapted to generate indicating signals which are representative of the illumination of said photoelectric receivers, two line screens, each of which is disposed between one of said photoelectric receivers and said graduated scale and has parallel, optically active lines which are parallel to said graduation lines, and two light sources, each of which is associated with one of said photoelectric receivers and operable to illuminate the same through said graduated scale and one of said line screens, whereby said photoelectric receivers are adapted to generate two cyclically changing indicating signals in response to the illumination by said light sources as said reading unit is moved along said graduated scale, said photoelectric receivers having such a spacing along said graduated scales that said cyclically changing indicating signals are displaced in phase, signal-processing circuitry for receiving and processing said cyclically changing indicating signals to generate processed indicating signals, a display device for receiving said processed signals and generating a display in response to said processed indicating signals, and power supply means for supplying electric power to said light sources, said signal-processing circuitry and said display device, said reading unit also comprising a housing, which accommodates said photoelectric receivers, line screens, light sources, signal-processing circuitry and display device and is open toward said graduated screen, the improvement residing in that said scale-carrying member has a first elongated surface, which faces said line screens and is provided with said graduated scale, a second elongated surface, which extends along said graduated scale and is free from said graduated lines, and a third elongated surface which extends along said graduated scale and faces away from said line screens, a reflector is provided which has a reflective surface, which adjoins said third elongated surface and faces said first and second elongated surfaces, said light sources are arranged to emit light which is incident on said scale-carrying member on said second elongated surface and is subsequently reflected by said reflecting surface through said graduated scale and said line screens onto said photoelectric receivers, said housing has a plug receptacle and carries terminal contacts, which are exposed in said receptacle and comprise a first set of terminal contacts for supplying power to said light sources, signal-processing circuitry and display device and a second set of terminal contacts for receiving said indicating signals, signal-receiving means are provided, which are adapted to receive signals having a predetermined format, a connecting plug is fitted in said plug receptacle and has power supply terminal contacts contacting said terminal contacts of said first set and signal contacts contacting said terminal contacts of said second set, an adapter unit is provided, which includes a power supply section and interfacial signal-processing circuitry, a cable is provided, which connects said power supply terminal contacts to said power supply section and said signal contacts to said signal processing circuitry, said interfacial signal-processing circuitry is operable to derive signals having said predetermined format from said indicating signals, and said plug receptacle is adapted to receive instead of said connecting plug a power supply plug which has power supply terminal contacts arranged to contact said terminal contacts of said first set when said power supply plug is fitted in said plug receptacle in a predetermined orientation and contains batteries which constitute said power supply means, whereby said hand-held measuring implement is adapted to be selectively used as a self-contained implement when said power supply plug is fitted in said plug receptacle.

10. The improvement set forth in claim 9, wherein said signal-receiving means comprise stationary display means for a display in dependence on said signals having said predetermined format.

11. The improvement set forth in claim 9, wherein said signal-receiving means comprise control means for performing control functions in response to said signals having said predetermined format.

12. The improvement set forth in claim 9, wherein said signal-receiving means comprise means for recording said signals having said predetermined format.

* * * * *